United States Patent [19]

Puetz

[11] Patent Number: 4,847,962
[45] Date of Patent: Jul. 18, 1989

[54] METHOD FOR PRODUCING POROUS BEARING SHELLS FOR GAS-STATIC BEARINGS

[75] Inventor: Heinrich Puetz, Much, Fed. Rep. of Germany

[73] Assignee: Interatom GmbH, Bergisch Gladbach, Fed. Rep. of Germany

[21] Appl. No.: 188,275

[22] Filed: Apr. 29, 1988

[30] Foreign Application Priority Data

May 5, 1987 [DE] Fed. Rep. of Germany ....... 3714933

[51] Int. Cl.⁴ ............................................ B21O 53/10
[52] U.S. Cl. ...................... 29/149.5 PM; 29/149.5 R; 29/149.5 NM; 29/447; 419/5; 419/26; 419/49
[58] Field of Search ................ 29/149.5 PM, 149.5 A, 29/149.5 R, 149.5 NM, 447; 384/134, 287100, 110; 419/8, 5, 26, 49, 2

[56] References Cited

U.S. PATENT DOCUMENTS 3,867,751 2/1975 Connell et al. ................ 29/148.4 R
4,393,563 7/1983 Smith .......................... 29/149.5 DP
4,719,075 1/1988 Tsuno et al. ........................ 419/5

FOREIGN PATENT DOCUMENTS 0180154 5/1986 European Pat. Off. .
1583731 9/1970 Fed. Rep. of Germany .
3230232 11/1982 Fed. Rep. of Germany .

Primary Examiner—P. W. Echols
Assistant Examiner—K. Jordan
Attorney, Agent, or Firm—Herbert L. Lerner; Laurence A. Greenberg

[57] ABSTRACT

A method for producing porous bearing shells with a compacted surface for gas-static bearings from sintered hollow blanks includes heating a blank with an inside diameter smaller than a rated diameter of a bearing and slipping the blank in the heated state onto a mandrel having an outside diameter equal to the rated diameter of the bearing. Subsequently the blank is cooled to the operating temperature of the bearing. The blank is reheated and the blank is finally pulled off the mandrel.

5 Claims, 1 Drawing Sheet

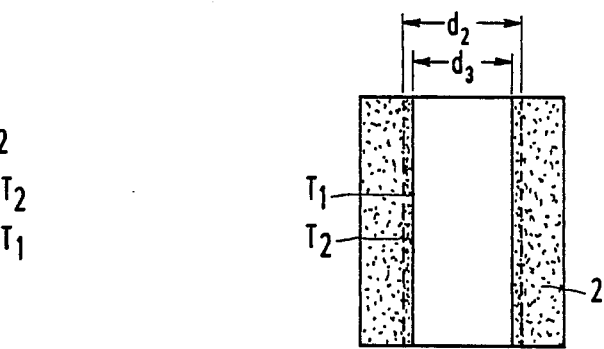
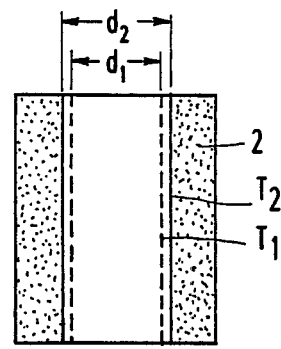
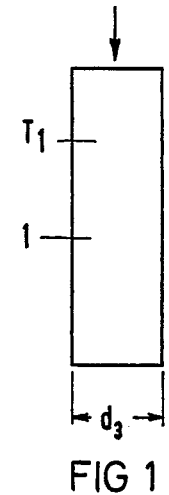
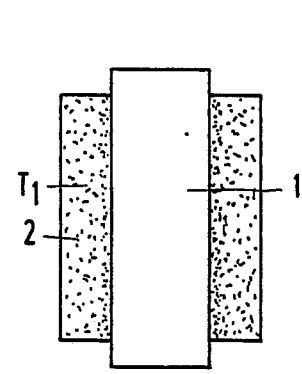
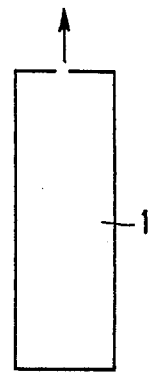
FIG 1  FIG 2  FIG 3

METHOD FOR PRODUCING POROUS BEARING SHELLS FOR GAS-STATIC BEARINGS

The invention relates to a method for producing porous bearing shells with a compacted surface for gas-static bearings from sintered hollow blanks.

German Published, Non-Prosecuted Application No. DE-A 32 30 232, discloses a bearing shell for a gas-static bearing and a method for the production thereof, in which the surface of a porous (such as a sintered) bearing shell is compacted by rolling or some other suitable method, in order to attain a throttling action of the bearing surface. The rolling closes numerous pores on the surface, so they must be reopened in an ensuing operation by means of electrocorrosion. These are laborious processes, in addition to which metal-cutting machining must also be performed under some circumstances in order to give the bearing shell an inside diameter of the desired rated dimension. Gas-static bearings of the type described above are used wherever conventional ball bearings are unsuitable, such as because of the required high rpm. Such bearings are used, for example, for bearings of dental drills or spindles in spinning machines.

It is accordingly an object of the invention to provide a method for producing porous bearing shells for gas-static bearings which overcomes the hereinafore-mentioned disadvantages of the heretofore-known methods of this general type and which enables a simpler, faster and less expensive manufacture of such bearing shells in one operation.

With the foregoing and other objects in view there is provided, in accordance with the invention, a method for producing porous bearing shells with a compacted surface for gas-static bearings from sintered hollow blanks which comprises heating a blank with an inside diameter smaller than or undersized as compared to a rated diameter of a bearing, slipping the blank in the heated state onto a mandrel having an outside diameter equal to the rated diameter of the bearing, subsequently cooling the blank to the operating temperature of the bearing, reheating the blank, and finally pulling the blank off the mandrel.

The conventional shrink-fitting method according to the invention causes the inner surface of the blank and the outer surface of the mandrel to be subjected to a considerable pressure load. Under this load there occurs a plastic deformation of the blank, because the pressure resistance thereof is less than that of the mandrel due to the presence of the pores in the blank, even though the characteristics of the solid materials of both are approximately the same. These pores are reduced in size, so that the desired compacting of the surface takes place on the intended bearing surface. The mandrel itself is at most only slightly deformed in the elastic range in this process. An optional selection of a mandrel size taking this circumstance into account ensures that the blank already has the desired dimension for the bearing shell without further machining when pulled back off the mandrel.

In accordance with another feature of the invention, there is provided a method which comprises selecting the difference between the diameter of the blank and the rated diameter of the bearing, or an undersize of the blank, as a function of the desired degree of compacting of the inner surface of the blank. In this way, the degree of compacting of the surface and the thickness of the compacted layer are adjusted by using blanks that have an undersize as compared with the mandrel such that the desired values are automatically attained by means of the shrinkage process.

In accordance with a further feature of the invention, there is provided a method which comprises selecting the degree of compacting of the inner surface of the blank for maintaining a number and size of pores sufficient for the passage of the required bearing gas flow through the pores. In this way, subsequent machining of the bearing surface for reopening of the pores closed by the compacting process can be dispensed with.

In accordance with an added feature of the invention, there is provided a method which comprises forming the mandrel of ceramic material. The ceramic material of the mandrel has a lower coefficient of thermal expansion than the sintered metal forming the blank. In such a case the blank does not need to be heated as severely in order to be pulled off the mandrel, for a given undersize.

In order to attain a defined degree of compacting, the undersize of the blank can be allowed to fluctuate within only a very small range of variation. Therefore, in accordance with a concomitant feature of the invention, there is provided a method which comprises dividing a multiplicity of blanks into classes in which the inside diameters in each class vary from one another by only a slight extent, and carrying out the slipping step by slipping the blanks of each class onto mandrels dimensionally adapted to the blanks, for processing blanks deviating to a greater extent in the inside diameters thereof. This is useful if the range of variation of the dimensions cannot be assured in the production of the blanks by means of a sintering method. The method described above then permits bearing shells having the desired accuracy and porosity to be produced in batches, each of which contains only blanks in which the variation range from the undersize defined by the diameter of the associated mandrel remains within the allowable limits. This may possibly cause the degree of compacting to differ in bearing shells belonging to different classes.

Other features which are considered as characteristic for the invention are set forth in the appended claims.

Although the invention is illustrated and described herein as embodied in a method for producing porous bearing shells for gas-static bearings, it is nevertheless not intended to be limited to the details shown, since various modifications may be made therein without departing from the spirit of the invention and within the scope and range of equivalents of the claims.

The method of operation of the invention, however, together with additional objects and advantages thereof will be best understood from the following description of specific embodiments when read in connection with the accompanying drawings.

FIGS. 1, 2 and 3 are diagrammatic, longitudinal axial-sectional views of a bearing shell illustrating the course of the method according to the invention by way of example.

Referring now to the figures of the drawings in detail and first, particularly, to FIG. 1 thereof, there is seen a bearing shell blank 2 of sintered metal which is slipped onto a mandrel 1 assumed to be undeformable in this case. The mandrel 1 has a diameter $d_3$, which corresponds to the desired inside diameter of the finished bearing shell. At a first temperature $T_1$ (typically, room temperature), the bearing shell blank has an inside diameter $d_1$ which is smaller than the diameter $d_3$ by a predetermined amount. $T_1$ corresponds to the operating temperature of the bearing if the bearing is used at the same temperature as the starting temperature for the method according to the invention. To this end, the inside diameter of the blank must be increased to a dimension $d_2$, which is greater than the diameter $d_3$ by a small amount sufficient for manipulation. This is accomplished by heating the blank from the temperature $T_1$ to a second temperature $T_2$, which results from the differences between the various diameters and the thermal expansion properties of the sintered material. The increase in diameter resulting from the increase in temperature is shown in FIG. 1. For the sake of simplicity, FIG. 1 does not show the increase in the outside diameter of the blank, which naturally takes place at the same time. After the blank 2 is slipped onto the mandrel 1, the blank is cooled down again to the temperature $T_1$, so that it shrinks to the condition shown in FIG. 2. Due to the presence of the mandrel 1, the inside diameter of the blank 2 is prevented from returning to the diameter $d_1$, but instead it remains at the diameter $d_3$. The resultant pressure forces plastically deform the inner surface of the blank 2 and by reducing the pore volume over a limited region, a compacting takes place, as indicated in the drawing by the more closely spaced dots. The blank 2 is then reheated to the temperature $T_2$, at which it can be pulled off as seen in FIG. 3 because of the increase in its inside diameter to the dimension $d_2$. After renewed cooling to the temperature $T_1$, the inside diameter approximately returns to the dimension $d_3$ (that is, not taking the elastic portions of the deformation into account), and a finished bearing shell 2, which no longer requires further machining steps, is then present.

I claim:

1. Method for producing porous bearing shells with a compacted surface for gas-static bearings, from sintered hollow blanks, which comprises the steps of (1) heating a blank with an inside diameter smaller than a rated diameter of a bearing, (2) slipping the blank in the heated state onto a mandrel having an outside diameter equal to the rated diameter of the bearing, (3) subsequently compacting the inner surface of the blank by cooling the blank to the operating temperature of the bearing, (4) reheating the blank, and (5) finally pulling the blank off the mandrel.

2. Method according to claim 1, which comprises selecting the difference between the diameter of the blank and the rated diameter of the bearing in order to provide a given degree of compacting of the inner surface of the blank.

3. Method according to claim 2, which comprises selecting the degree of compacting of the inner surface of the blank for maintaining a number and size of pores sufficient for the passage of a given bearing gas flow through the pores.

4. Method according to claim 1, which comprises employing a mandrel made of ceramic material.

5. Method according to claim 1, which comprises dividing a multiplicity of blanks into classes in which the inside diameters in each class vary from one another by no more than a given extent, and carrying out the slipping step by slipping the blanks of each class onto mandrels dimensionally adapted to the blanks, for processing blanks deviating to an extent in the inside diameters thereof which is greater than the given extent.

* * * * *